July 29, 1947.　　　E. H. MORTAG　　　2,424,578
WHEEL AND AXLE UNIT
Filed Dec. 6, 1944

INVENTOR.
E. H. Mortag
BY
Robbs Robb
Attys.

Patented July 29, 1947

2,424,578

UNITED STATES PATENT OFFICE 2,424,578

WHEEL AND AXLE UNIT

Edward H. Mortag, Milwaukee, Wis., assignor to Koehring Company, Milwaukee, Wis., a corporation Application December 6, 1944, Serial No. 566,922

3 Claims. (Cl. 74—287.5)

My present invention pertains to the art of driving axle and wheel units, and involves particularly an improved unit of this type designed for use in conjunction with heavy vehicles such as trucks, tractors, scrapers, or the like.

The improvements of my invention involve primarily a novel construction of axle housing and driving shaft means associated therewith, together with an improved wheel hub structure, and drive gear instrumentalities intermediate said driving means and the hub structure.

A special feature of my invention lies in the provision of a wheel hub so designed as to provide a gear or pinion supporting spider or carrier adapted to support a plurality of driven pinions intergeared with a floating driving gear or pinion directly carried by the driving shaft. The driving gear or driving pinion of the driving shaft is so intergeared with the driven pinions of the pinion carrier or spider of the hub that the said driving gear is centralized by the driving pinions and has a sort of floating mounting in respect thereto. The general arrangement of the gearing which I provide between the wheel hub and the driving shaft is such that it is of the planetary type, and derives, therefore, the advantages incident to the latter class of gearing.

A full understanding of my invention will be had upon reference to the accompanying drawings, in which.

Figures 1, 2:
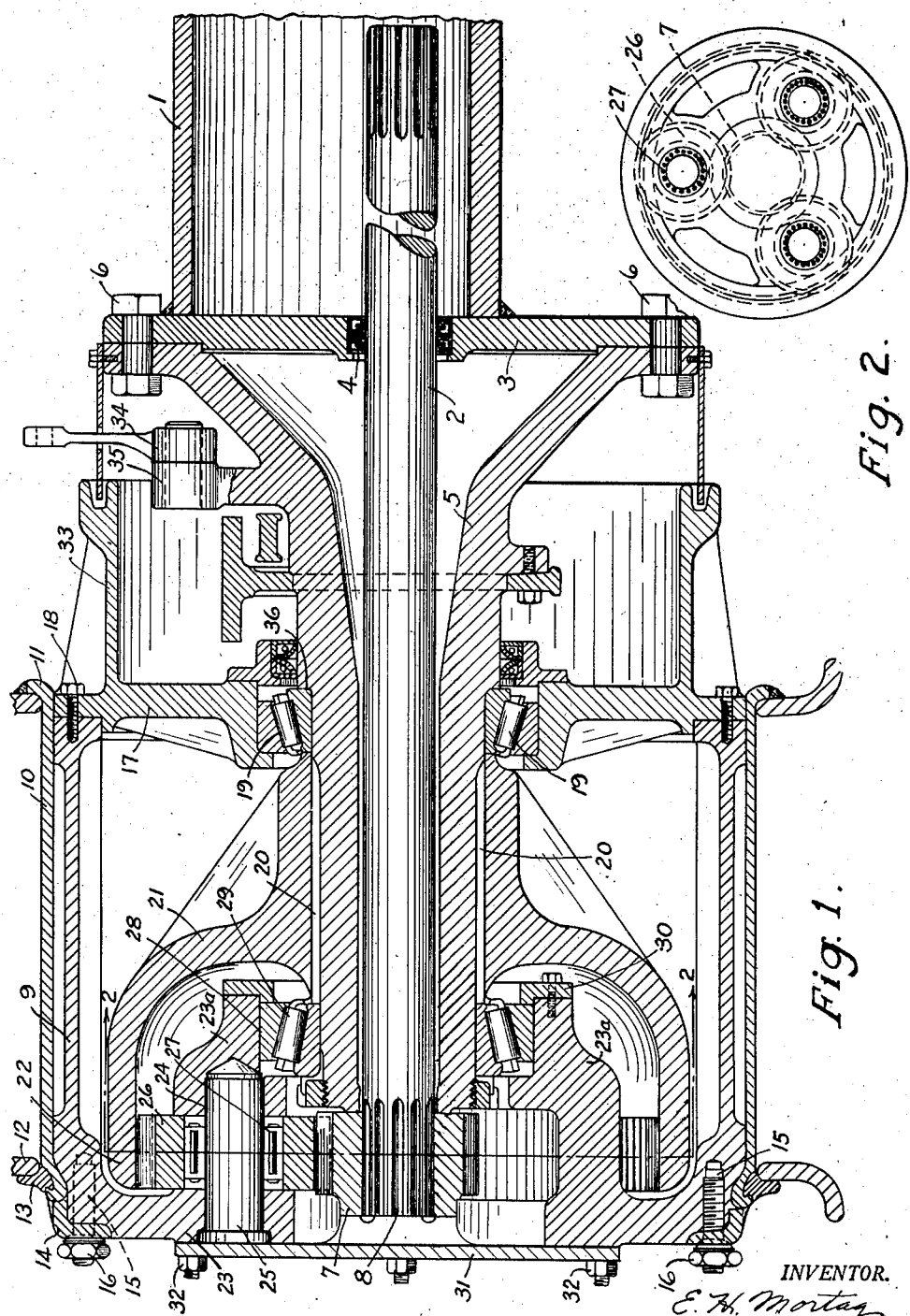
Figure 1 is a general sectional view longitudinally of the wheel carrying portion of the wheel and axle unit, showing the improved features of my invention.
Figure 2 is an end view of the stationary ring gear and rotative spider or gear carrier of the hub of the wheel unit, illustrating more clearly the disposition of the planet pinions and the central driving pinion or gear coacting therewith.

Specifically describing one preferred embodiment of my invention and referring to the drawings, the numeral 1 denotes an axle housing with which is ordinarily associated differential gearing, not shown, from which gearing the driving shaft or shaft section 2 is operated after the manner of conventional drives employed today for trucks and similar vehicles. The housing 1, which is shown primarily in reference to its outer end portion, is provided with a closing end plate or member 3 integrally or otherwise attached thereto and through an opening 4 in which plate the driving shaft 2 passes, said opening being provided with a suitable grease and oil seal surrounding the shaft 2.

Outstanding from the member 3 of the housing 1 is a load carrying hollow axle member 5 constituting virtually an extension of the housing 1, and this member is attached to the end member 3 of the housing 1 by means of bolts or suitable attaching parts 6. The axle member 5 tapers toward its outer end, and through the hollow portion of said member the shaft or shaft section 2 extends throughout the length of the member 5 and has its outer end projecting beyond the outer end of said member 5 to receive thereon the gear 7 attached to the shaft 2 by suitable splines 8. In this manner the rotative drive imparted to the shaft 2 is correspondingly imparted to the gear 7 fixed to the shaft.

The foregoing presents generally the axle structure forming a part of my invention, and, as customary, there is associated with the same a wheel structure at each end of the housing 1, the wheel unit being carried by the hollow axle member 5.

My wheel structure is unique in that it comprises the hub 9 of substantially cylindrical formation, on the periphery of which member is carried the supporting rim 10 for the usual tire, said rim involving the inner flange 11, the outer removable flange 12, and the lock ring 13, common features for holding the tire in place on the rim. The rim itself is held seated upon inner and outer rim seats on the hub 9 by employment of the customary attachment plates 14 held in position by the bolts 15 and nuts 16.

The hub structure of my invention is peculiar in that it comprises the inner plate and bearing member 17 attached near its outer periphery by a plurality of screw bolts 18 to the adjacent inner end of the hub 9. The plate or bearing member 17 is formed with a central opening through which the hollow axle member 5 passes, and suitable roller or similar bearings 19 are provided between the member 5 and the periphery of the central opening of the member 17, as above referred to.

Received upon the outer portion of the axle member 5 intermediate its ends and connected rigidly therewith by means of splines 20 is the stationary hub 21 of a ring gear 22. This ring gear has the teeth thereof formed at its outer end portion and the body of the gear curves outwardly and laterally from the hub 21 within the space surrounded by the wheel hub 9.

The wheel hub 9 at its outer end portion is formed with an integral spider or pinion carrier 23, the outermost portion of which partially closes the hollow space of the hub 9 at the outer end of the latter. The carrier or spider 23 is provided with bearings 24 in which are received the shafts 25 of the planet pinions 26, said pinions being freely rotatable upon the shafts 25. Otherwise described, the pinion carrier 23 may be said to comprise the outer portion referred to, and the inner extension 23a, which two parts are suitably spaced so as to enable the introduction of the pinions 26 thereinto previous to the emplacement of the shafts 25 through the bores or openings of the pinions. The parts 23a virtually constitute inboard bearing members for the inner ends of the shafts 25, and preferably there will be interposed between the bearing openings of the pinions 26 and the shafts 25 suitable roller or other bearings designated 27.

The extensions or bearing members 23 of the pinion spider or carrier not only act as bearing means for the shafts 25 but said members provide an outer bearing for the hub structure, designated 28, between which bearing 28 and the axle member 5 are interposed the outer supporting bearings 29 for the hub 9, these bearings acting in conjunction with the inner bearings 19, previously described, for rotatively mounting the hub upon the axle member 5 and enabling its rotation in relation to the member 5 which is stationary and the ring gear 22 which is likewise stationary because of its non-rotative connection by the splines 20 with the member 5.

A ring plate 30 at the inner end of the extension 23a of the carrier 23 coacts to hold the outer races for the bearings 29 in place.

Attached to the outer face of the carrier or spider member 23 is a cap or closing plate 31 secured in place to the part 23 by means of bolts 32 or the like, and providing a thrust bearing plate for the outer ends of the shafts 25.

It will be obvious from the foregoing that removal of the plate 31 will afford access to the interior parts of the hub and associated parts on the axle member 5, enabling ready removal and replacement of these parts under conditions of service of the assembled unit, with obvious advantages to be derived from the construction in the light of the foregoing.

The operation of the wheel and axle unit as described above involves the rotation of the driving shaft 2 by the differential gearing at the middle of the housing 1, which will span the vehicle in the customary manner, the drive of the shaft 2 being imparted to the driving pinion or gear 7 the same in turn rotating the planet gears 26. These gears travelling around the internal or ring gear 22 will obviously rotate the shafts 25 in their orbit of rotation, transmitting their bodily movement to the spider or pinion carrier 23, and since this member is integrally or otherwise attached to the hub 9 the hub of the wheel will be rotated with the tire mounted thereon.

The construction of the unit as described is simple, compact, and affords an efficient operating unit for the rugged service requirements of wheel and axle structures of the class set forth.

It is noted that the inner plate or member 17 of the hub unit is preferably formed with an integral brake drum and any conventional, now used, operating means for the brake shoes may be provided, energized, for instance, by a lever 34 carried on a supporting lug 35 at the top portion of the axle member 5. The axle member 5 will be supported in any suitable manner upon the frame or chassis of the vehicle. The positioning of the inner race for the bearings 19 will be controlled by a shoulder 36 on the outer periphery of the member 5.

Having thus described my invention, what I claim as new and desire to secure by Letters Patent of the United States, is—

1. An axle and wheel unit of the class described, comprising a stationary hollow axle member, a driving shaft mounted for rotation therein and passing therethrough, a driving pinion stationary on the outer end of said shaft and external to the axle member, a hollow hub surrounding the axle member and comprising an inner end plate, antifriction bearings between the end plate and the axle member, a spider carried by the outer end of the hub and projecting into the hollow space thereof, a series of planet pinions rotatively supported on said spider and disposed within the hub and meshing with the driving pinion aforesaid, a ring gear having internal gear teeth and comprising a hub portion splined to the stationary axle member, receiving therein the portion of the spider projecting into the hollow space of the hub, and having its gear meshing with the teeth of the planet pinions, supporting shafts for the driven pinions carried by the spider and displaceable outwardly therefrom and from the hub member, a closing plate for closing the outer portion of the hub member cooperating with the planet pinion shafts to hold the same in position and removable to enable access to the planet pinion shafts while the latter remain in position, the planet pinions, and the ring gear, and bearing means intermediate the innermost portion of the spider and said axle member located within the hub.

2. In a wheel and axle unit of the class described, in combination, a stationary load carrying axle member, a driving shaft mounted therein and extending to the outer side thereof, a driving pinion carried by the outer end of said shaft, a wheel structure comprising a hub associated with said axle member, a spider member removably fixed to and supported by the hub at the outer end of the latter, said spider member having an integral pinion shaft supporting extension projecting inwardly into the hub, a plurality of pinion shafts mounted on said spider member, driven pinions carried by said plurality of shafts and engaging the driving pinion of the driving shaft, and a ring gear fixed to the axle member and having internal gear teeth intermeshing with the teeth of the driven pinions, combined with a closing plate detachably applied to the outer side of the spider and coacting with the outer ends of the pinion shafts to prevent outward displacement of the latter.

3. In a wheel and axle unit of the class described, in combination, a stationary load carrying axle member, a driving shaft mounted therein and extending to the outer side thereof, a driving pinion carried by the outer end of said shaft, a wheel structure comprising a hub associated with said axle member, a spider member removably fixed to and supported by the hub at the outer end of the latter, a plurality of pinion shafts mounted on said spider member, driven pinions carried by said plurality of shafts and engaging the driving pinion of the driving shaft, and a ring gear fixed to the axle member and having internal gear teeth intermeshing with the teeth of the driven pinions, the ring gear comprising a hollow member having a hub which is the part affixed to the axle member, said hollow member of the ring gear being dimensioned to receive therein the inward extension of the spider and also the driven pinions on the spider, whereby removal of the spider will displace the pinion shafts as a unit, the pinion shafts having enlarged heads at the outer side of the spider.

EDWARD H. MORTAG.

REFERENCES CITED

The following references are of record in the file of this patent:

UNITED STATES PATENTS

| Number | Name | Date |
|---|---|---|
| 1,151,381 | Olson | Aug. 24, 1915 |
| 1,241,870 | Megow | Oct. 2, 1917 |
| 1,370,378 | Stair | Mar. 1, 1921 |
| 1,417,795 | Cook et al. | May 30, 1922 |
| 1,464,887 | Starr | Aug. 14, 1923 |
| 1,467,939 | Knap | Sept. 11, 1923 |

FOREIGN PATENTS

| Number | Country | Date |
|---|---|---|
| 362,335 | Germany | Oct. 26, 1922 |